US012058488B2

(12) United States Patent
Chen et al.

(10) Patent No.: US 12,058,488 B2
(45) Date of Patent: Aug. 6, 2024

(54) ACTIVE NOISE CANCELLATION HEADPHONE

(71) Applicant: Beken Corporation, Shanghai (CN)

(72) Inventors: Lulai Chen, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 376 days.

(21) Appl. No.: 17/648,397

(22) Filed: Jan. 19, 2022

(65) Prior Publication Data

US 2023/0224623 A1 Jul. 13, 2023

(30) Foreign Application Priority Data

Jan. 12, 2022 (CN) ......................... 202210033472.1

(51) Int. Cl.
*H04R 1/10* (2006.01)

(52) U.S. Cl.
CPC ......... *H04R 1/1041* (2013.01); *H04R 1/1083* (2013.01)

(58) Field of Classification Search
None
See application file for complete search history.

(56) References Cited

U.S. PATENT DOCUMENTS

2014/0254818 A1* 9/2014 Tse ........................ H04R 1/1041 381/74
2015/0358716 A1* 12/2015 Zhu ...................... H04R 1/1041 381/74
2016/0270717 A1* 9/2016 Luna ...................... A61B 5/743
2020/0159897 A1* 5/2020 Schmitt ................ H04R 1/1033
2022/0038820 A1* 2/2022 Graham .............. G10L 21/0208

* cited by examiner

*Primary Examiner* — Harry S Hong
(74) *Attorney, Agent, or Firm* — Schwegman Lundberg & Woessner, P.A.

(57) ABSTRACT

A headphone, having a sleep mode and a full-power operation mode, includes a sensor set to detect a state of a wearer in a sleep state or an awake state, Active Noise Cancellation (ANC) earphones, and a controller coupled to the sensor set and the earphones, which can control the headphone to switch between the sleep and the full-power operation modes based on the detected state of the wearer. Once the controller determines the wearer falling into the sleep state, the controller will switch the headphone from the full-power operation mode to the sleep mode, turn off the earphones, and increase the wearer state detection interval used while the headphone being in the sleep mode. This may reduce power consumption of the headphone and help improve the sleep quality of the wearer.

20 Claims, 4 Drawing Sheets

ACTIVE NOISE CANCELLATION HEADPHONE

CROSS REFERENCE TO RELATED APPLICATIONS TECHNICAL FIELD

This application claims priority to and incorporates by reference Chinese Patent Application No. 202210033472.1 filed 12 Jan. 2022.

TECHNICAL FIELD

The present application relates to a noise cancellation or reduction technology, and more particularly a method and a headphone for Active Noise Cancellation (ANC).

BACKGROUND OF THE APPLICATION

Nowadays, noise pollution has been a problem that is harmful to human health. Typically, passive devices and active devices are used to reduce or cancel noise. ANC headphones can actively reduce noise, especially low-frequency noise, for example.

BRIEF DESCRIPTION OF THE APPLICATION

According to an embodiment, a headphone comprises: a sensor set to detect a state of a wearer of the headphone, wherein the sensor set comprises an infrared sensor, a heart rate sensor, and a motion sensor, and wherein the state comprises a sleep state or an awake state; one or more earphones; and a controller coupled to the sensor set and the one or more earphones, wherein the controller controls the headphone to switch between the sleep mode and a full-power operation mode based on the state of the wearer.

According to an embodiment, a computer-implemented method of controlling a headphone, the headphone in a sleep mode or a full-power operation mode comprising: a sensor set, one or more earphones, and a controller coupled to the sensor set and the one or more earphones, the method comprising: determining by the sensor set a state of a wearer of the headphone, wherein the sensor set comprises an infrared sensor, a heart rate sensor, and a motion sensor; upon determining the state to be a sleep state, switching by the controller the headphone from a full-power operation mode to a sleep mode; turning off by the controller the one or more earphones; and resetting by the controller a wearer state detection interval from a first wearer state detection interval used for the full-power operation mode to a second wearer state detection interval used for the sleep mode, the second wearer state detection interval being greater than the first wearer state detection interval.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

DETAILED DESCRIPTION OF THE ILLUSTRATED EMBODIMENTS

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section.

Without loss of generality, reference will be made to illustrative embodiments by taking a headphone and a method of controlling a headphone that can detect a state of a headphone wearer and can switch the headphone between a sleep mode and a full-power operation mode based on the detected state of the wearer as example. Those of ordinary skill in the art understand that this is only to describe the application clearly and adequately, rather than limit the scope of the application, which is defined by the appended claims.

The term "sleep state" indicates that a wearer is detected asleep, and the term "awake state" indicates that the wearer is detected awake or not asleep in this description.

The term "sleep mode" indicates that a headphone is in a standby or a low-power mode, and upon resuming, allowing the wearer to avoid having to reissue instructions or to wait for the headphone to reboot in this description. The terms "full-power operation mode", "full-power mode", and "awake mode" can be used interchangeably in this description.

The term "wearer state detection interval" represents a time difference between a current wearer state detection and a next wearer state detection in this description.

Figure 1:
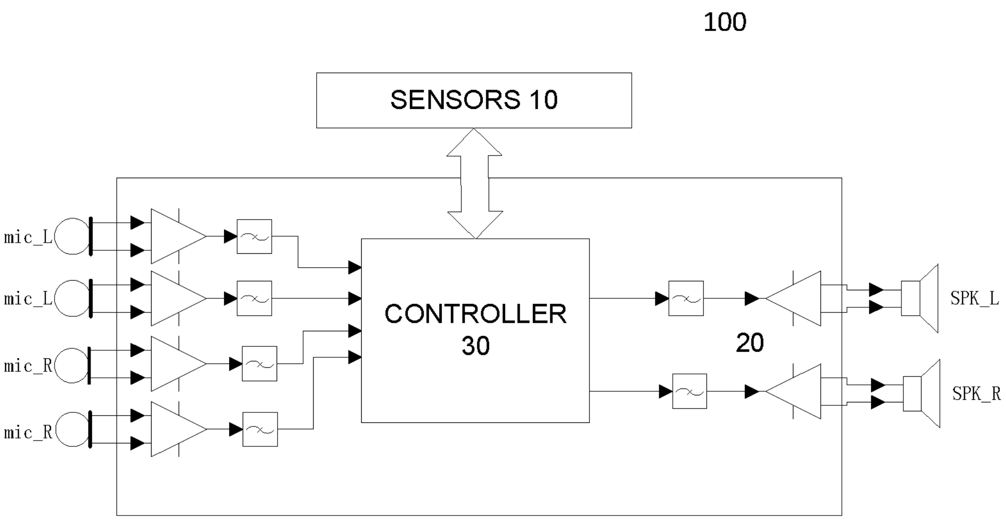
FIG. 1 is a diagram illustrating a headphone according to an embodiment.

FIG. 1 is a diagram illustrating a headphone 100 that can be in a sleep mode or a full-power operation mode according to an embodiment. The headphone 100 may include a sensor set 10, one or more earphones 20, and a controller 30 that is coupled to the sensor set 10 and the one or more earphones 20. The headphone 100 may include two earphones 20 (e.g., the left and the right earphones) as shown in FIG. 1, and may also include a single earphone 20. The earphones 20 can be ANC earphones. The controller 30 may include a Digital Signal Processor (DSP) or a Micro-Controller Unit (MCU).

In an embodiment, the sensor set 10 may include one or more sensors, such as an infrared sensor, a heart rate sensor, and a motion sensor, for example. The sensor set 10 may detect a state of a wearer of the headphone 100 based on the detection results from the sensors. The state of the wearer may include a sleep state or an awake state.

The infrared sensor may detect a contact state between the wearer and the earphone 20, that is whether the wearer is in contact or out of contact with the earphone 20.

Figure 4:
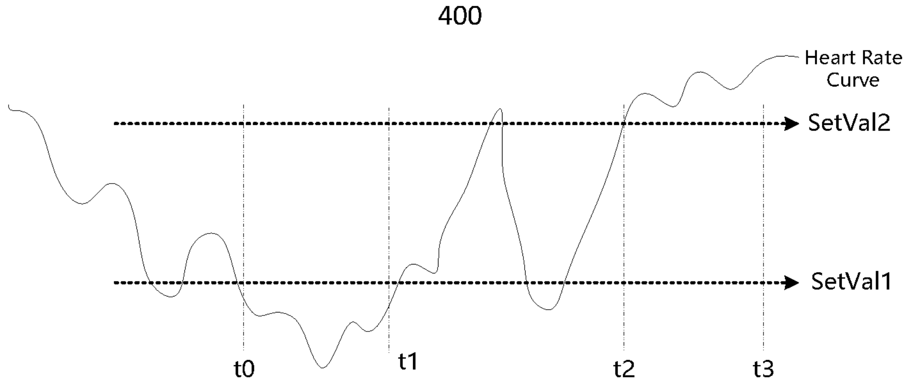
FIG. 4 is a chart illustrating an example of detecting a sleep state of a wearer of a headphone according to a heart rate curve of the wear according to an embodiment.

The heart rate sensor may detect heart rates of the wearer, examine whether the heart rates being within a predetermined heart rate range for a delayer period of time (e.g., 2 minutes), and determine a heart rate state to be stable or unstable, for example. FIG. 4 shows an example of detecting a sleep state of a wearer of a headphone 100 based on the heart rate curve of the wear.

The motion sensor may detect motions of the wearer, examine whether the motions being within a predetermined motion range for a delayer period of time (e.g., 2 minutes), and determine a motion state of the wearer to be stationary or nonstationary. The motion sensor can be a gyroscope, for example.

Figure 2:
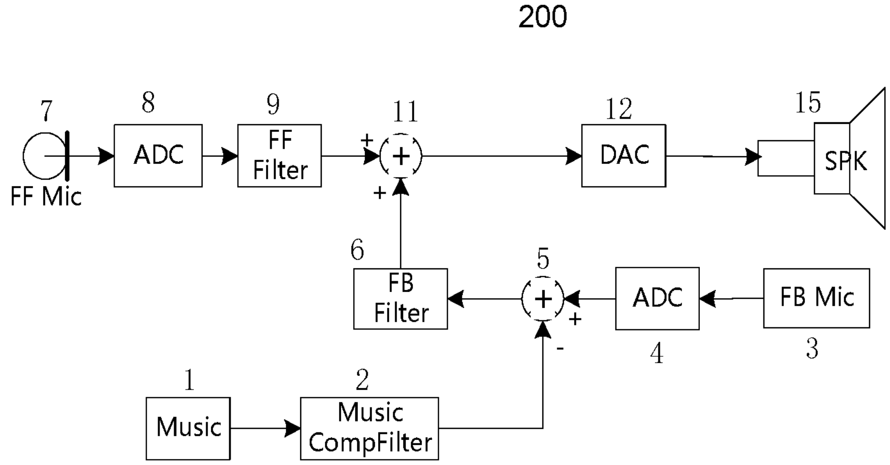
FIG. 2 is a diagram illustrating an ANC earphone according to an embodiment.

FIG. 2 is a diagram illustrating an ANC earphone 200 of the headphone 100 according to an embodiment. The ANC earphone 200 can be one of the earphones 20 in FIG. 1. The ANC earphone 200 may include a compensation filter 2 to compensate and filter a music received from a music source 1 (e.g., a music player in a smartphone) and a speaker (SPK) 15. The ANC earphone 200 may also include a feedback (FB) microphone (mic) 3 near the SPK 15 to capture residual noise, a first ADC 4 coupled to the FB mic 3, a first adder 5 to add signals received from the compensation filter 2 and the ADC 4, and a FB filter 6 coupled to the first adder 5. The ANC earphone 200 may also include a forward feedback (FF) mic 7 to capture external noise, a second ADC 8 coupled to the FF mic 7, an FF filter 9 coupled to the second ADC 8, a second adder 11 to add signals from the FB filter 6 and the FF filter 9, and a DAC 12 coupled to the second adder 11 and the SPK 15. In this way, both the external noise captured by the FF Mic 7 and the residual noise captured by the FB Mic 3 near the SPK 15 are processed and output to the SPK 15 to actively reduce or cancel noise.

Figure 3:
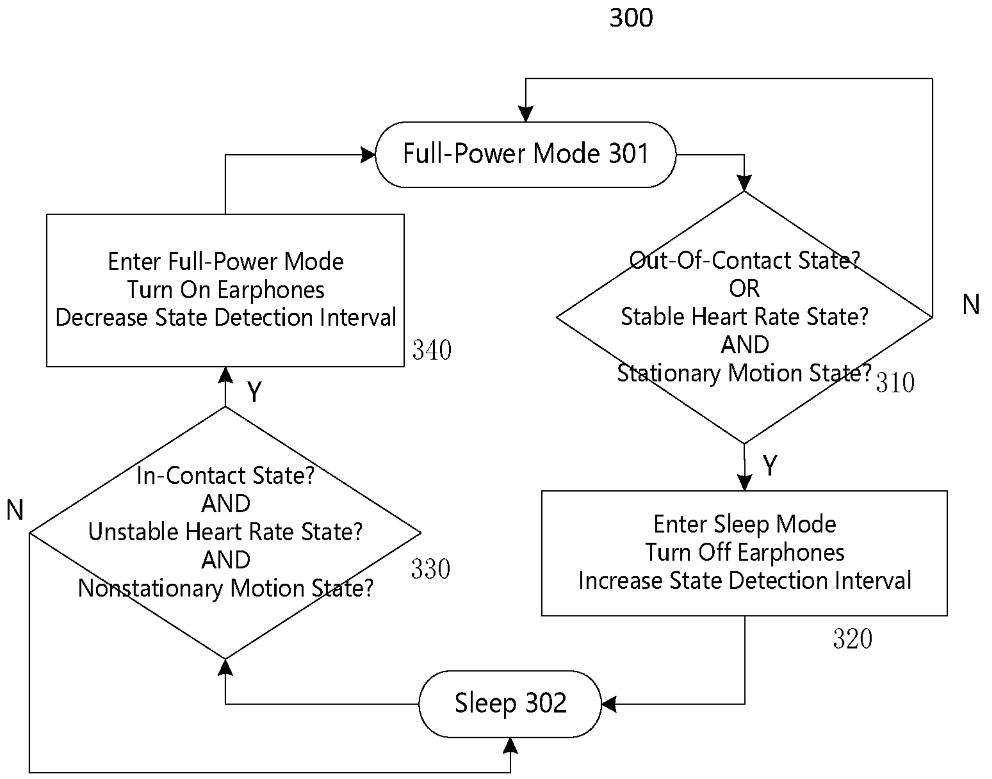
FIG. 3 is a flow chart illustrating switch conditions for a headphone between a full-power operation mode and a sleep mode according to an embodiment.

FIG. 3 is a flow chart 300 illustrating switch conditions for a headphone 100 switching between a full-power operation mode 301 and a sleep mode 302 according to an embodiment. The controller 30 may determine a state of a wearer of the headphone 100 based on detection results obtained by the sensors (such as the infrared, the heart rate, and the motion sensors) of the sensor set 10.

In an embodiment, the controller 30 may determine the state of the wearer of the headphone 100 based on a contact state detected by the infrared sensor, a heart rate state detected by the heart rate sensor, and/or a motion state of the wearer detected by the motion sensor at 310 or 330.

At 310, while the headphone 100 being in the full-power operation mode 301, once determining the contact state between the wearer and the ANC earphones 30 to be out-of-contact, the controller 30 determines the wearer is in the sleep state.

At 310, while the headphone 100 being in the full-power operation mode 301, once determining the heart rate state of the wearer to be stable (or the heart rates of the wearer to be in a predetermined range as shown in FIG. 4) for a delayed period of time (e.g., 50 seconds), and the motion state of the wearer to be stationary (or the motions of the wearer to be in a predetermined range) for the delayed period of time (e.g., 50 seconds), the controller 30 also determines the wearer is in the sleep state.

At 320, upon determining the wearer being in the sleep state, the controller 30 switches the mode of the headphone 100 into the sleep mode 302, turns off the ANC earphones 20, and increases a wearer state detection interval to a longer wearer state detection interval (e.g., 15 seconds). The headphone 100 thus performs the wearer state detection less frequently in the sleep mode 302 than in the full-power operation mode 301.

In another embodiment, upon determining the wearer being in the sleep state, the controller 30 may switch the mode of the headphone 100 into the sleep mode 302, and may cease audio output of the ANC earphones 20 while maintaining ANC in the sleep mode 302.

At 330, while the headphone 100 being in the sleep mode 302, once determining the contact state between the wearer and the earphones 20 to be in-contact, the heart rate state of the wearer to be unstable (or the heart rates of the wearer to be beyond a predetermined range as shown in FIG. 4) for a delayed period of time (e.g., 50 seconds), and the motion state of the wearer to be nonstationary (or the motions of the wearer to be beyond a predetermined range) for the delayed period of time (e.g., 50 seconds), the controller 30 determines the wearer being in the awake state.

At 340, upon determining the wearer being in the awake state, the controller 30 switches the mode of the headphone 100 into the full-power operation mode 301, turns on the ANC earphones 20, and decreases a wearer state detection interval to a shorter wearer state detection interval (e.g., 5 seconds). The headphone 100 thus performs the wearer state detection more frequently in the full-power operation mode 301 than in the sleep mode 302.

In this way, the headphone 100 may detect the state of the wearer, automatically turn off the earphones 20 or just cease audio output while maintaining ANC when determining the wearer being falling into a sleep state, and thus may reduce power consumption and help improve sleep quality of the wearer.

FIG. 4 is a chart 400 illustrating an example of detecting a sleep state of a wearer of a headphone 100 according to a heart rate curve of the wear according to an embodiment. To reduce or prevent miscalculation, the sleep state is determined or confirmed by detected continuous sleep signs or indications for a delayed period of time for example.

As shown in FIG. 4, while in the full-power operation mode 301, before the moment to, the heart rate sensor 10 occasionally or less frequently detects the heart rate lower than a first threshold value SetVal1, and thus the controller 30 determines that the wearer is in an awake state and does not switch the headphone 100 into the sleep mode 302.

However, while in the full-power operation mode 301, during a delayed period of time from t0 to t1, the heart rate sensor 10 constantly or frequently detects the heart rate lower than the first threshold value SetVal1, and thus the controller 30 determines that the wearer falls into the sleep state and switches the headphone into the sleep mode 302 at the moment t1.

While in the sleep mode 302, during a period of time from t1 to t2, the heart rate sensor 10 occasionally or less frequently detects the heart rate higher than a second threshold value SetVal2, the controller 30 determines that the wearer is still in the sleep state and does not switch the headphone 100 into the full-power operation mode 301.

However, while in the sleep mode 302, during a delayed period of time from t2 to t3, the heart rate sensor 10 constantly or frequently detects the heart rate higher than the second threshold value SetVal2, the controller 30 determines that the wearer wakes up and switches the headphone 100 into the full-power operation mode 301 at the moment t3. The second threshold value SetVal2 is greater than the first threshold value SetVal1.

Figure 5:
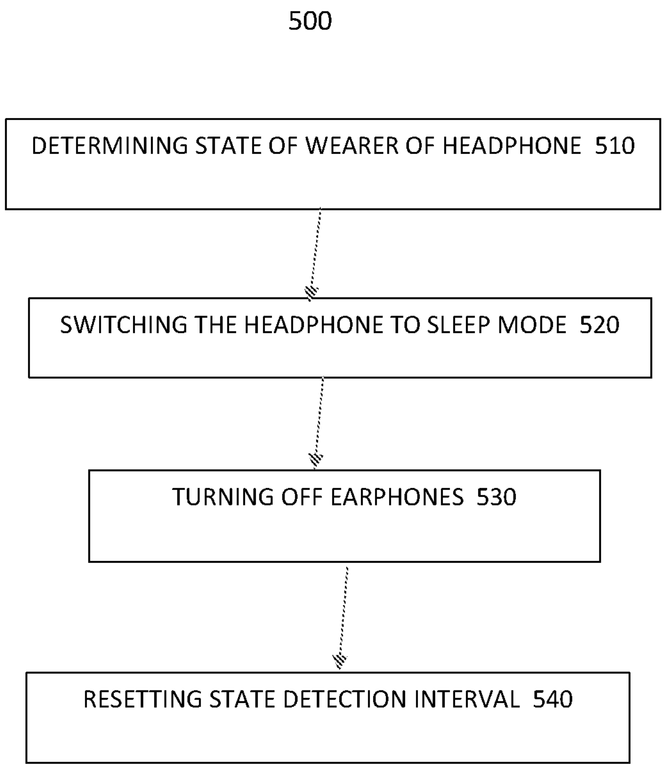
FIG. 5 is a flow chart illustrating a method of controlling a headphone according to an embodiment.

FIG. 5 is a flow chart illustrating a method 500 of controlling a headphone 100 according to an embodiment.

As explained with respect to FIG. 1, the headphone 100 may be in a full-power operation mode 301 or a sleep mode 302, and may include a sensor set 10, one or more earphones 20, and a controller 30 coupled to the sensor set 10 and the one or more earphones 20. The sensor set 10 may include an infrared sensor, a heart rate sensor, and a motion sensor.

At 510, determining using the sensor set 10 a state of a wearer of the headphone 100. In an embodiment, determining the state of the wearer may include detecting by the infrared sensor a contact state between the wearer and the earphones 20 to be in-contact or out-of-contact, determining using the heart rate sensor a heart rate state of the wearer to be stable or unstable, and/or determining using the motion sensor a motion state of the wearer to be stationary or nonstationary.

Once the infrared sensor detects the contact state to be out-of-contact, the controller 30 determines the state of the wearer to be the sleep state.

Once the heart rate sensor determines the heart rate state to be stable and the motion sensor determining the motion state to be stationary for a delayed time length (e.g., 50 seconds), the controller 30 determines the state of the wearer to be the sleep state.

At 520, upon the controller 30 determining the state of the wearer to be a sleep state, switching by the controller 30 the headphone 100 from the full-power operation mode 301 to the sleep mode 302.

At 530, turning off by the controller 30 the one or more earphones 20 or ceasing audio output while maintaining ANC.

At 540, resetting by the controller 30 a wearer state detection interval to switch from a first wearer state detection interval (e.g., 5 seconds) used for the full-power operation mode 301 to a second wearer state detection interval (e.g., 15 seconds) used for the sleep mode 302. The second wearer state detection interval used in the sleep mode 302 is increased and longer than the first wearer state detection interval used in the full-power operation mode 301.

In an embodiment, once detecting by the infrared sensor 10 the contact state to be in-contact, determining by the heart rate sensor 10 the heart rate state to be unstable, and determining by the motion sensor 10 the motion state to be nonstationary, the controller 30 determines the state of the wearer to be an awake state.

In an embodiment, upon determining the state of the wearer of the headphone 100 to be an awake state, switching by the controller 30 the headphone 100 from the sleep mode 302 to the full-power operation mode 301, turning on by the controller 30 the one or more earphones 20, and resetting by the controller 30 the first wearer state detection interval (e.g., 5 seconds) while the headphone 100 in the full-power operation mode 301.

This may detect the state of the wearer, enter into the sleep mode and turn off the earphones once detecting the wearer falling into the sleep state, increase the wearer state detection interval once the headphone being in the sleep mode, and thus may reduce power consumption and help improve the sleep quality of the wearer.

Figure 6:
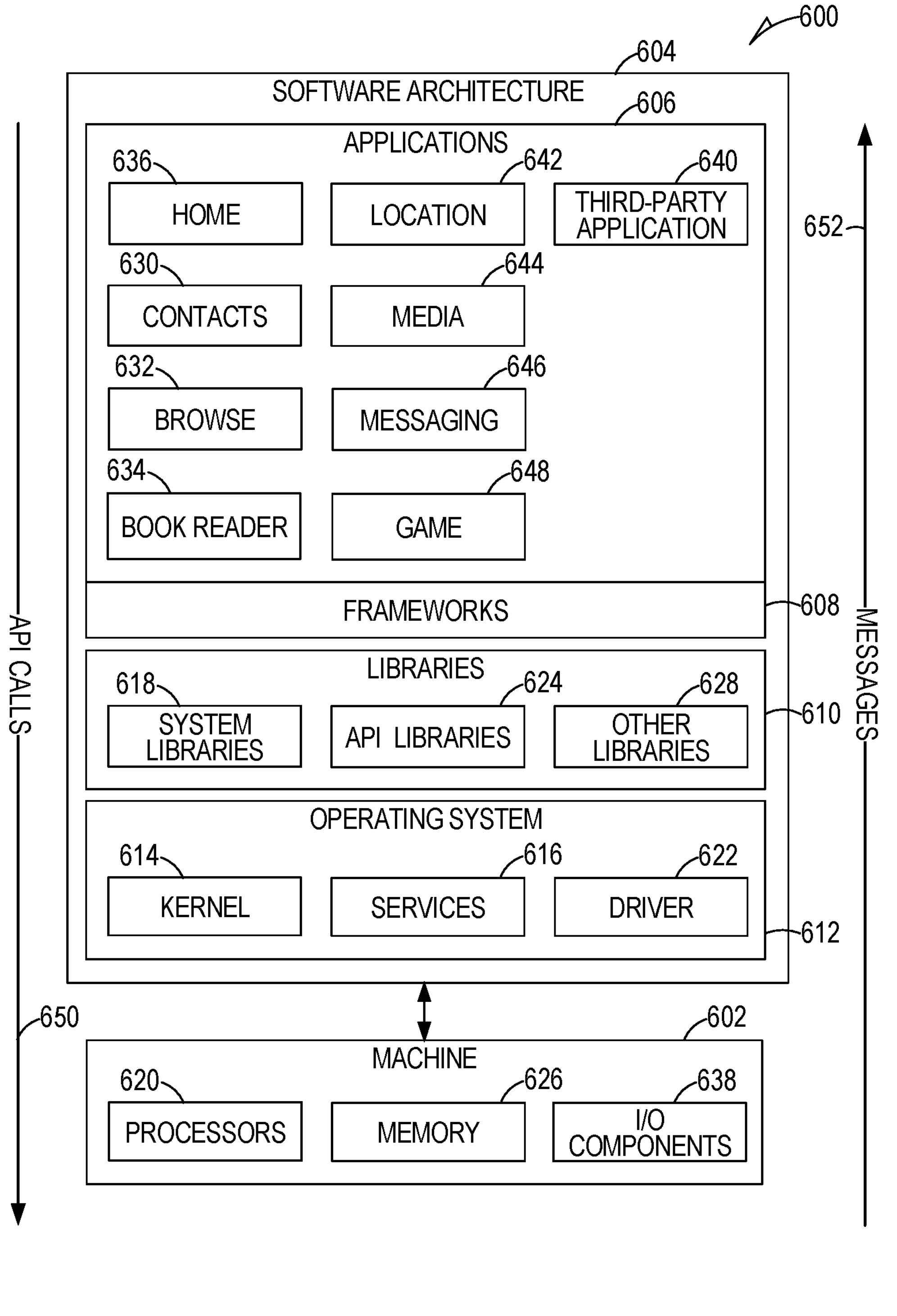
FIG. 6 is a block diagram showing a software architecture within which examples may be implemented.

FIG. 6 is a block diagram 600 illustrating a software architecture 604, which can be installed on a headphone 100 (e.g., on the controller 30 of the headphone 100) described herein.

The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

One skilled in the art will appreciate that although specific embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A headphone (100) in a sleep mode or a full-power operation mode, comprising:

a sensor set (10) to detect a state of a wearer of the headphone, wherein the sensor set comprises an infrared sensor, a heart rate sensor, and a motion sensor, and wherein the state comprises a sleep state or an awake state;

one or more earphones (20); and a controller (30) coupled to the sensor set and the one or more earphones, wherein the controller controls the headphone to switch between the sleep mode and a full-power operation mode based on the state of the wearer.

2. The headphone of claim 1, wherein the infrared sensor detects to determine a contact state of the wearer with the one or more earphones to be in-contact or out-of-contact.

3. The headphone of claim 2, wherein the heart rate sensor detects heart rates of the wearer for a predetermined time length, examines whether the heart rates to be within a predetermined heart rate range, and determines a heart rate state of the wearer to be stable or unstable.

4. The headphone of claim 3, wherein the motion sensor detects motions of the wearer for the predetermined time length, examines whether the motions of the wearer to be within a predetermined motion range, and determines a motion state of the wearer to be stationary or nonstationary.

5. The headphone of claim 4, wherein the controller determines the state of the wearer based on the contact state, the heart rate state, and the motion state of the wearer.

6. The headphone of claim 5, wherein once determining the contact state to be out-of-contact, the controller determines the wearer is in the sleep state.

7. The headphone of claim 5, wherein once determining the heart rate state to be stable and the motion state to be stationary, the controller determines the wearer is in the sleep state.

8. The headphone of claim 5, wherein once determining the contact state to be in-contact, the heart rate state to be unstable, and the motion state to be nonstationary, the controller determines the wearer is in the awake state.

9. The headphone of claim 1, wherein while the headphone is in the full-power operation mode, once determining the wearer in the sleep state, the controller switches the mode of the headphone from the full-power operation mode to the sleep mode.

10. The headphone of claim 1, wherein while the headphone is in the sleep mode, once determining the wearer in the awake state, the controller switches the mode of the headphone from the sleep mode to the full-power operation mode.

11. The headphone of claim 1, wherein while the headphone is in the full-power operation mode, the sensor set detects the state of the wearer repeatedly with a first detection interval, wherein while the headphone is in the sleep mode, the sensor set detects the state of the wearer repeatedly with a second detection interval, and wherein the second detection interval is greater than the first detection interval.

12. The headphone of claim 1, wherein once the controller switches the mode of the headphone from the full-power operation mode to the sleep mode, the controller turns off the one or more earphones.

13. The headphone of claim 1, wherein once the controller switches the mode of the headphone from the sleep mode to the full-power operation mode, the controller turns on the one or more earphones.

14. The headphone of claim 1, wherein the controller comprises a Digital Signal Processor (DSP) or a Micro-Controller Unit (MCU).

15. The headphone of claim 1, wherein the one or more earphones comprise one or more Active Noise Cancellation (ANC) earphones.

16. A computer-implemented method of controlling a headphone, the headphone in a sleep mode or a full-power operation mode comprising: a sensor set, one or more earphones, and a controller coupled to the sensor set and the one or more earphones, the method comprising:

determining by the sensor set a state of a wearer of the headphone, wherein the sensor set comprises an infrared sensor, a heart rate sensor, and a motion sensor;

upon determining the state to be a sleep state, switching by the controller the headphone from a full-power operation mode to a sleep mode;

turning off by the controller the one or more earphones; and resetting by the controller a wearer state detection interval to switch from a first wearer state detection interval used for the full-power operation mode to a second wearer state detection interval used for the sleep mode, the second wearer state detection interval being greater than the first wearer state detection interval.

17. The method of claim 16, further comprising:

upon determining the state of the wearer to be an awake state, switching by the controller the headphone from the sleep mode to the full-power operation mode; and turning on by the controller the one or more earphones.

18. The method of claim 16, wherein determining the state of the wearer comprises:

determining, by the infrared sensor, a contact state of the wearer with the one or more earphones to be in-contact or out-of-contact;

determining, by the heart rate sensor for a predetermined time length, a heart rate state of the wearer to be stable or unstable; and determining, by the motion sensor for the predetermined time length, a motion state of the wearer to be stationary or nonstationary.

19. The method of claim 18, wherein once determining by the infrared sensor the contact state to be out-of-contact, the controller determines the state of the wearer to be the sleep state, and wherein once determining by the heart rate sensor the heart rate state to be stable and determining by the motion sensor the motion state to be stationary, the controller determines the state of the wearer to be the sleep state.

20. The method of claim 18, wherein once determining by the infrared sensor the contact state to be in-contact, determining by the heart rate sensor the heart rate state to be unstable, and determining by the motion sensor the motion state to be nonstationary, the controller determines the state of the wearer to be an awake state.

* * * * *